United States Patent
Nishida

(10) Patent No.: US 12,478,952 B2
(45) Date of Patent: Nov. 25, 2025

(54) METHOD FOR INCREASING AMOUNT OF WATER ABSORBED UNDER LOAD BY WATER ABSORBENT RESIN PARTICLES, AND METHOD FOR PRODUCING WATER ABSORBENT RESIN PARTICLES

(71) Applicant: SUMITOMO SEIKA CHEMICALS CO., LTD., Hyogo (JP)

(72) Inventor: Moe Nishida, Himeji (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 685 days.

(21) Appl. No.: 17/597,324

(22) PCT Filed: Jul. 1, 2020

(86) PCT No.: PCT/JP2020/025847
§ 371 (c)(1),
(2) Date: Jan. 3, 2022

(87) PCT Pub. No.: WO2021/006152
PCT Pub. Date: Jan. 14, 2021

(65) Prior Publication Data
US 2022/0314199 A1     Oct. 6, 2022

(30) Foreign Application Priority Data
Jul. 5, 2019   (JP) .................. 2019-126334

(51) Int. Cl.
*B01J 20/34*  (2006.01)
*B01J 20/26*  (2006.01)
*B01J 20/28*  (2006.01)
*B01J 20/30*  (2006.01)

(52) U.S. Cl.
CPC ............ *B01J 20/34* (2013.01); *B01J 20/261* (2013.01); *B01J 20/267* (2013.01); *B01J 20/28016* (2013.01)

(58) Field of Classification Search
None
See application file for complete search history.

(56) References Cited

FOREIGN PATENT DOCUMENTS

| | | |
|---|---|---|
| CN | 101808727 | 8/2010 |
| CN | 105593119 | 5/2016 |
| EP | 0812873 B1 | 10/2003 |
| EP | 2190572 | 6/2010 |
| EP | 2263939 | 12/2010 |
| EP | 3031857 | 6/2016 |
| EP | 3053831 | 8/2016 |
| EP | 3112022 | 1/2017 |
| EP | 3127606 | 2/2017 |
| EP | 3243565 | 11/2017 |

(Continued)

OTHER PUBLICATIONS

International Search Report of PCT/JP2020/025847, Sep. 1, 2020, 2 pages.

(Continued)

*Primary Examiner* — Daniel Berns
(74) *Attorney, Agent, or Firm* — HSML P.C.

(57) ABSTRACT

Disclosed is a method for improving a water absorption amount under load by water absorbent resin particles, the method including shaking a powder containing a plurality of water absorbent resin particles contained in a container. An amount of powder corresponding to a theoretical filling rate of less than 100% may be contained in the container.

5 Claims, 2 Drawing Sheets

(56) References Cited

FOREIGN PATENT DOCUMENTS

| | | |
|---|---|---|
| EP | 3312218 | 4/2018 |
| JP | 2002-212301 | 7/2002 |
| JP | 2005-015995 | 1/2005 |
| JP | 2006-168324 | 6/2006 |
| JP | 2011-231255 | 11/2011 |
| JP | 2014-094379 | 5/2014 |
| WO | 2004/069936 | 8/2004 |
| WO | 2009/041731 | 4/2009 |
| WO | 2020/129594 | 6/2020 |

OTHER PUBLICATIONS

The extended European search report issued for European Patent Application No. 20836986.8, Oct. 17, 2023, 6 pages.
International Preliminary Report on Patentability of PCT/JP2020/025847, Jan. 20, 2022, 5 pages.

METHOD FOR INCREASING AMOUNT OF WATER ABSORBED UNDER LOAD BY WATER ABSORBENT RESIN PARTICLES, AND METHOD FOR PRODUCING WATER ABSORBENT RESIN PARTICLES

TECHNICAL FIELD

The present invention relates to a method for improving a water absorption amount under load by water absorbent resin particles, and a method for producing water absorbent resin particles.

BACKGROUND ART

Water absorbent resin particles are widely used in fields of sanitary materials and the like. It is necessary that the water absorbent resin particles maintain a large water absorption amount even under load or pressure (for example, Patent Literatures 1 and 2).

CITATION LIST

Patent Literature

[Patent Literature 1] Japanese Unexamined Patent Publication No. 2002-212301
[Patent Literature 2] Japanese Unexamined Patent Publication No, 2011-231255

SUMMARY OF INVENTION

Technical Problem

An aspect of the present invention provides a method capable of easily improving a water absorption amount under load by water absorbent resin particles.

Solution to Problem

An aspect of the present invention relates to a method for improving a water absorption amount under load by water absorbent resin particles, the method including shaking a powder containing a plurality of water absorbent resin particles contained in a container.

Another aspect of the present invention relates to a method for producing water absorbent resin particles, the method including improving a water absorption amount under load by water absorbent resin particles by the method described above.

Advantageous Effects of Invention

According to one aspect of the present invention, it is possible to easily improve the water absorption amount under load by the water absorbent resin particles.

DESCRIPTION OF EMBODIMENTS

Hereinafter, some embodiments of the present invention will be described in detail. However, the present invention is not limited to the following embodiments.

In the present specification, "(meth)acryl" means both acryl and methacryl. In the same manner, "acrylate" and "methacrylate" are also referred to as "(meth)acrylate". The same also applies to other similar terms. "(Poly)" means both with and without the prefix "poly". In numerical ranges described stepwise in the present specification, an upper limit value or a lower limit value of a numerical range of one step can be arbitrarily combined with an upper limit value or a lower limit value of a numerical range of another step. In a numerical range described in the present specification, an upper limit value or a lower limit value of the numerical range may be replaced with values shown in examples. "Water-soluble" means that it exhibits a solubility of 5% by mass or more in water at 25° C. The materials exemplified in the present specification may be used alone or in combination of two or more. "Saline solution" refers to a 0.9% by mass sodium chloride aqueous solution.

Figure 1:
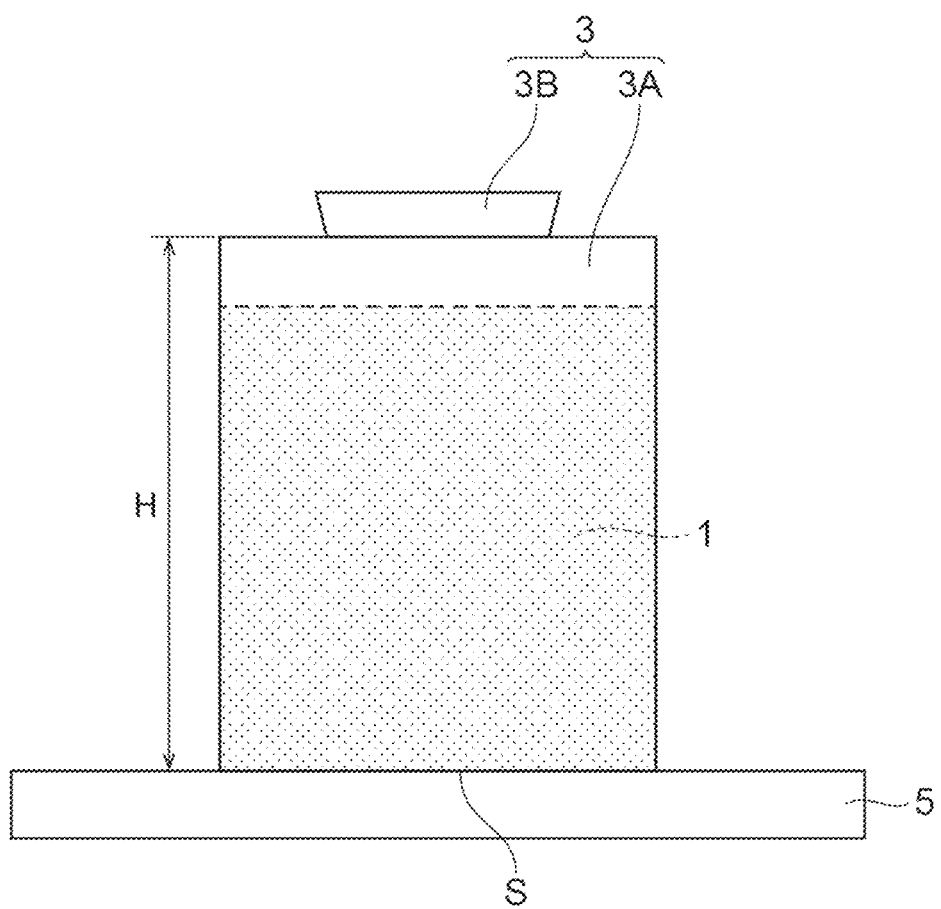
FIG. 1 is a schematic view showing an embodiment of shaking a powder containing water absorbent resin particles.

FIG. 1 is a schematic view showing an embodiment of shaking a powder containing a plurality of water absorbent resin particles. In the method of FIG. 1, a powder 1 contained in a container 3 is shaken. The container 3 is disposed on a support 5, and the powder 1 in the container 3 can be shaken by vibration of the support 5, Water absorbent resin particles having a larger water absorption amount under load are obtained by the shaking. The powder 1 is typically configured with substantially only water absorbent resin particles, but other particles may be contained in the powder 1. A rate of the water absorbent resin particles to a total amount of the powder 1 may be 80 to 100% by mass, 90 to 100% by mass, or 95 to 100% by mass.

The container 3 includes a bag-shaped main body portion 3A and a lid portion 3B provided at one end of the main body portion 3A. The main body portion 3A is not particularly limited, and may be, for example, a wooden box, a cardboard box, a plastic bag, or a cloth bag. A flexible bag, such as a plastic bag as the main body portion of the container, may be mounted inside a more rigid outer box (for example, a cardboard box). The lid portion 3B may have an openable structure. The powder 1 may be shaken in a state where the lid portion 3B is closed, that is, a state where the powder 1 is sealed in the main body portion 3A. The powder 1 may be shaken while transporting the container 3 containing the powder 1.

The container 3 may be completely filled with the powder 1, or as shown in the drawing, the amount of the powder 1 may be somewhat less than a maximum capacity of the container 3. For example, the amount of powder 1 corresponding to a theoretical filling rate of less than 100% may be contained in the container 3. The theoretical filling rate here is a value calculated by the following equation.

$$\text{Theoretical filling rate } [\%] = \{(X[\text{g}]/D[\text{g/mL}])/V[\text{mL}]\} \times 100$$

In the equation, X represents a mass of the powder 1, D represents a tapped bulk density of the powder 1, and V represents a maximum capacity of the container 3. In a case where the amount of the powder 1 is less than 100%, which corresponds to the theoretical filling rate, it tends to be easy to obtain water absorbent resin particles showing a larger water absorption amount under load. From the same viewpoint, the amount of powder 1 may be 95% or less, or 90% or less, which corresponds to the theoretical filling rate. From a viewpoint of efficiency, the amount of powder 1 may correspond to 50% or more, 60% or more, or 65% or more, of the theoretical filling rate.

The tapped bulk density of the powder containing the water absorbent resin particles is measured by a method in examples which will be described later. The maximum capacity V of the container is a maximum capacity of a portion that can contain the powder (main body portion 3A in the example of FIG. 1). In a case where there is a description of the maximum capacity in the specification or the like of the container, the numerical value thereof may be deemed as the maximum capacity V of the container for convenience. The maximum capacity V may be obtained by actually measuring a volume of water that completely fills the container. The calculated value of the volume calculated from sizes and shapes of members constituting the container can also be deemed as the maximum capacity V of the container. In a case where the container includes an openable opening, the maximum capacity V is a maximum capacity in a case where the opening is closed. In a case where the main body portion of the container is a flexible bag such as a plastic bag or a cloth bag, the calculated value of the volume in a state where the main body portion (bag) is expanded until the volume is maximized is set as the maximum capacity V of the container. In addition, in a case where the flexible bag is mounted inside a rigid outer box, an internal volume of the outer box is set as the maximum capacity V of the container. In the case of the container 3 of FIG. 1, the main body portion 3A has a rectangular parallelepiped shape having a bottom surface S, and the maximum capacity V of the container 3 can be calculated from an area and a height H of the bottom surface S.

The maximum capacity of the container in which the powder containing the water absorbent resin particles is contained for shaking is not particularly limited, and may be, for example, 10 mL to 2000 L. A total mass of the water absorbent resin particles to be shaken is not particularly limited, and may be, for example, 10 g to 2000 kg.

A maximum value of an acceleration received by the powder during the shaking may be 0.050 to 4.0 G. In a case where the acceleration is within this range, the water absorption amount under load tends to improve more remarkably. From the same viewpoint, the maximum value of the acceleration may be 0.10 to 3.0 G, 0.30 to 2.5 G, 0.5 to 2.5 G, or 1.0 G to 2.5 G. The maximum value of the acceleration can be calculated based on an amplitude and a frequency of vibration for the shaking.

A time for shaking the powder containing the water absorbent resin particles (shaking time) may be a length that improves the water absorption amount under load by the water absorbent resin particles, and may be, for example, 10 minutes or longer, 20 minutes or longer or 30 minutes or longer, or may be 24 hours or shorter. It is not necessary to continuously shake the powder contained in the container, and the powder may be shaken intermittently while stopping the shaking one or more times in the middle. In a case where the powder containing the water absorbent resin particles is shaken intermittently, a total shaking time may be within the range described above.

The water absorption amount under load by the water absorbent resin particles after the shaking may be, for example, 15 to 30 g/g. A ratio of the water absorption amount under load by the water absorbent resin particles after the shaking to the water absorption amount under load by the water absorbent resin particles before the shaking may be 103% or more, 105% or more, or 110% or more, and may be 150% or less. The water absorption amount under load here is a value measured by the method described above in examples which will be described later.

The water absorbent resin particles are not particularly limited, and may be particles containing a polymer containing an ethylenically unsaturated monomer as a monomer unit. The ethylenically unsaturated monomer may be a water-soluble monomer, and examples thereof include (meth)acrylic acid and a salt thereof, 2-(meth)acrylamide-2-methylpropanesulfonic acid and a salt thereof, (meth) acrylamide, N,N-dimethyl (meth)acrylamide, 2-hydroxyethyl (meth)acrylate, N-methylol (meth)acrylamide, polyethylene glycol mono(meth)acrylate, N,N-diethylaminoethyl (meth)acrylate, N,N-diethylaminopropyl (meth) acrylate, and diethylaminopropyl (meth)acrylamide. The ethylenically unsaturated monomer may be used alone or in combination of two or more. In a case where the ethylenically unsaturated monomer has a functional group such as a carboxyl group or an amino group, these can function as a functional group for crosslinking the polymer. The water absorbent resin particles may be particles containing a polymer containing at least one of (meth)acrylic acid or a salt of (meth)acrylic acid as a monomer unit.

The polymer constituting the water absorbent resin particles may be a crosslinked polymer. In this case, the polymer may be crosslinked by self-crosslinking, crosslinking by a reaction with a crosslinking agent, or both of them. The water absorbent resin particles may be surface-crosslinked by crosslinking at least the polymer of a surface layer portion thereof with a crosslinking agent. The water absorption amount under load by the surface-crosslinked water absorbent resin particles can be greatly improved by the shaking. The crosslinking agent for the surface crosslinking may be referred to as a surface crosslinking agent.

Examples of the crosslinking agent include polyols such as ethylene glycol, propylene glycol, 1,4-butanediol, trimethylolpropane, glycerin, polyoxyethylene glycol, polyoxypropylene glycol, and polyglycerin; compounds having two or more epoxy groups such as (poly)ethylene glycol diglycidyl ether, (poly)propylene glycol diglycidyl ether, and (poly)glycerin diglycidyl ether; haloepoxide compounds such as epichlorohydrin, epibromhydrin, and α-methylepichlorohydrin; compounds having two or more isocyanate groups such as 2,4-tolylene diisocyanate and hexamethylene diisocyanate; oxazoline compounds such as 1,2-ethylene hisoxazoline; carbonate compounds such as ethylene carbonate; and hydroxyalkylamide compounds such as bis [N,N-di(β-hydroxyethyl)]adipamide. The crosslinking agent may include a polyglycidyl compound such as (poly)ethylene glycol diglycidyl ether, (poly)glycerin diglycidyl ether, (poly)glycerin triglycidyl ether, (poly)propylene glycol polyglycidyl ether, and polyglycerol polyglycidyl ether. These crosslinking agents may be used alone or in combination of two or more.

The water absorbent resin particles may contain various additional components, in addition to the polymer of the ethylenically unsaturated monomer. Examples of additional components include a gel stabilizer, a metal chelating agent, and a flowability improving agent (lubricant), The additional components may be disposed inside the polymer particles containing the polymer, on surfaces of the polymer particles, or both of them. The additional component may be a flowability improving agent (lubricant). The flowability improving agent may contain inorganic particles. Examples of the inorganic particles include silica particles such as amorphous silica.

A shape of the water absorbent resin particles is not particularly limited, and may be, for example, a substantially spherical shape, a crushed shape, or a granular shape, and particles obtained by aggregating primary particles having these shapes may be formed. A median particle size of the water absorbent resin particles may be 250 to 850 μm, 300 to 700 μm, or 300 to 600 μm.

The water absorbent resin particles can be, for example, produced by a method including obtaining water absorbent resin particles containing a polymer containing an ethylenically unsaturated monomer as a monomer unit by a method including polymerizing a monomer containing an ethylenically unsaturated monomer, and improving the water absorption amount under load by the water absorbent resin particles by the method according to the embodiment described above. The monomer polymerization method can be selected from, for example, a reverse phase suspension polymerization method, an aqueous solution polymerization method, a bulk polymerization method, and a precipitation polymerization method. From viewpoints of ensuring better water absorption characteristics of the water absorbent resin particles and easily controlling a polymerization reaction, the reverse phase suspension polymerization method or the aqueous solution polymerization method may be used, if necessary, formation of particles by a crosslinking reaction during or after the polymerization, or pulverization, drying, and the like can be performed by a general method. The surface-crosslinked water absorbent resin particles can be obtained by a reaction between the particles after the polymerization and the drying and the surface crosslinking agent.

Various absorbent products such as diapers can be produced by using the water absorbent resin particles having an improved water absorption amount under load.

EXAMPLES

Hereinafter, the present invention will be described in more detail with reference to examples. However, the present invention is not limited to these examples.

1. Measurement Method 1-1. Tapped Bulk Density of Powder Consisting of Water Absorbent Resin Particles The tapped bulk density of the powder consisting of water absorbent resin particles was measured with a powder property evaluation device (manufactured by Hosokawa Micron Corporation, model number: PT-X), by the following procedure. The tapped bulk density was measured under conditions of room temperature (25° C.±2° C.) and humidity of 50%±10%.

A mass W0 of a cup-shaped container (volume of 100 mL, inner diameter of approximately 50 mm, height of approximately 50 mm) in an empty state was measured. Next, a cylindrical cap (inner diameter of approximately 51 mm, height of approximately 51 mm) was attached to an upper portion of the container. Through an upper opening of the cap, 100 g of powder was put into a container with a scoop attached to a device. Subsequently, the container was placed on a tapping lift bar (tapping device), and the powder in the container was impacted by tapping 180 times with a stroke of 18 mm. Then, after removing the cap, the powder in a portion raised from the upper opening of the container was removed by scraping with a blade. Subsequently, a mass W1 of the container containing the powder was measured. Based on the mass W0 and the mass W1 the tapped bulk density was obtained by the following equation. The tapped bulk density was measured three times in total, and an average value thereof was recorded as the tapped bulk density D [g/mL] of the powder consisting of water absorbent resin particles.

$$\text{Tapped bulk density [g/mL]} = (W1[g] - W0[g])/100$$

1-2. Theoretical Filling Rate

The theoretical filling rate in a case where the powder consisting of water absorbent resin particles was put into a polyethylene bag with a zipper was obtained by the following equation.

$$\text{Theoretical filling rate [\%]} = \{(X[g]/D[g/mL])/V[mL]\} \times 100$$

In the equation, X represents a mass of the powder, D represents a tapped bulk density of the powder, and V represents a capacity of a polyethylene bag. A volume of a maximum amount of pure water that can be filled in the polyethylene bag with the zipper closed was measured, and this was defined as the maximum capacity of the polyethylene bag.

1-3. Water Absorption Amount Under Load (Load: 4.14 kPa)

Figure 2:
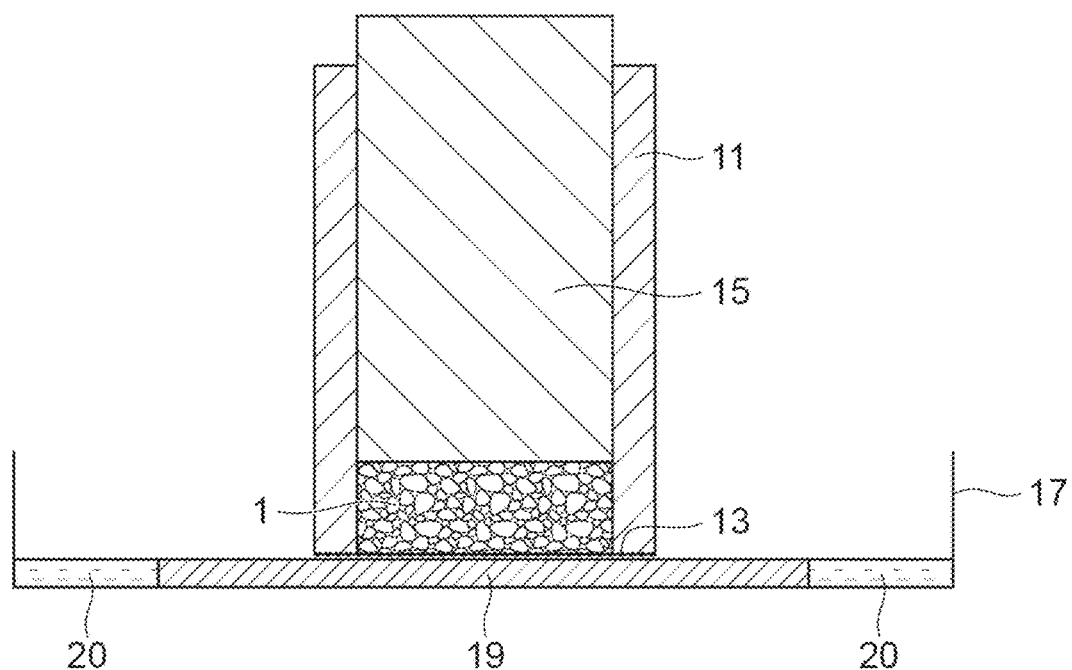
FIG. 2 is a schematic view showing a method of measuring a water absorption amount under load by the water absorbent resin particles.

The water absorption amount under load was measured under conditions of room temperature (25° C. 2° C.) and humidity of 50%±10%. FIG. 2 is a schematic view showing a method for measuring the water absorption amount under load. A glass filter 19 (diameter of 9 cm, thickness of 7 mm, standard: ISO4793, P-250) was placed in a petri dish 17 having an inner diameter of 12 cm. Next, a saline solution 20 was put into the petri dish 17 to a height of the glass filter 19. The powder 1 consisting of the water absorbent resin particles having the mass X [g] was evenly put into a cylinder 11 (inner diameter of 2.0 cm: outer diameter of 3.0 cm: height of 5.0 cm) in which a 255 mesh bolting cloth (nylon mesh) 13 is mounted on an end portion. Here, X was 0.1000±0.0005 g. On the powder 1 in the cylinder, a cylindrical weight 15 having a mass for applying a pressure of 4.14 kPa to the powder 1 was placed. The weight 15 has an outer diameter slightly smaller than the inner diameter of the cylinder, and can smoothly move in a vertical direction in the cylinder. In this state, the total mass W1[g] (total mass of the powder 1, the cylinder 11, the bolting cloth 13, and the weight 15) was measured. The cylinder 11 containing the powder 1 and the weight 15 was placed on the glass filter 19 in the petri dish 17, and the powder 1 was swollen with the saline solution 20 for 1 hour. A total mass W2 [g] of the swelled powder 1, the cylinder 11, the bolting cloth 13, and the weight 15 was measured. A loss on drying A [%] of the powder consisting of the water absorbent resin particles was also separately measured by the method which will be described later. The water absorption amount under load was calculated by the following equation.

$$\text{water absorption amount under load [g/g]} = (W2 - W1)/\{X \times (100 - A)/100\}$$

The water absorption amount under load was measured five times, and an average value of the obtained measured values was recorded as the water absorption amount under load by the water absorbent resin particles. According to this method, the water absorption amount under load is measured by removing an effect of the change in loss on drying on the measured value. Therefore, even in a case where the loss on drying increases or decreases, a numerical value of the water absorption amount under load can be compared.

1-4. Loss on Drying 2.0 g of powder consisting of water absorbent resin particles was placed on an aluminum wheel case (No. 8) having a constant amount (W3 (g)) in advance, and a mass W4 (g) thereof was precisely weighed. The precisely weighed powder was dried for 2 hours in a hot air dryer (manufactured by ADVANTEC, model: FV-320) whose internal temperature was set to 105° C. After allowing the powder to cool in a desiccator, a mass W5 (g) thereof was measured as a dry mass. The loss on drying of the water absorbent resin particles was calculated from the following equation.

Loss on drying (% by mass)=[{(W4−W3)−(W5−W3)}/(W4−W3)]×100

2. Water Absorbent Resin Particles

Example 1

Aquakeep SA60SXII (trade name, particles containing sodium polyacrylate) manufactured by Sumitomo Seika Chemicals Co., Ltd. was prepared as the water absorbent resin particles of Example 1.

Example 2

A round-bottomed cylindrical separable flask having an inner diameter of 11 cm and a volume of 2 L including a reflux condenser, a dropping funnel, a nitrogen gas introduction pipe, and a stirrer blade having four inclined paddle blades having a blade diameter of 5 cm in two stages as a stirrer was prepared. In this flask, 293 g of n-heptane and 0.736 g of a maleic anhydride-modified ethylene-propylene copolymer (manufactured by Mitsui Chemicals, Inc., High Wax 1105A) as a dispersant were mixed with each other. The dispersant was dissolved in n-heptane by raising the temperature to 80° C. while stirring the mixture in the separable flask with a stirrer. The formed solution was cooled to 50° C.

92.0 g (1.03 mol) of an acrylic acid aqueous solution having a concentration of 80.5% by mass as a water-soluble ethylenically unsaturated monomer was put into a beaker having an internal volume of 300 mL, and 147.7 g of an sodium hydroxide aqueous solution having a concentration of 20.9% by mass was added dropwise into the beaker while cooling from the outside, thereby performing neutralization of 75 mol %. Then, 0.092 g of hydroxylethyl cellulose (Sumitomo Seika Chemicals Co., Ltd., HEC AW-15F) as a thickener, 0.092 g (0.339 mmol) of 2,2'-azobis (2-amidinopropane) dihydrochloride and 0.018 g (0.067 mmol) of potassium persulfate as a radical polymerization initiator, and 0.0046 g (0.026 mmol) of ethylene glycol diglycidyl ether as an internal crosslinking agent were added and dissolved to prepare an aqueous solution for a first stage.

The aqueous solution for the first stage was added to a n-heptane solution containing the dispersant in the separable flask, and the formed reaction solution was stirred for 10 minutes. A surfactant solution obtained by dissolving 0.736 g of sucrose stearic acid ester (Mitsubishi Chemical Foods Co. Ltd., Ryoto Sugar Ester S-370, HLB: 3) which is a surfactant, in 6.62 g of n-heptane was further added thereto, and the gas in the system was sufficiently substituted with nitrogen while stirring the reaction solution by setting a rotation rate of the stirrer as 550 rpm. Then, the separable flask was immersed in a water bath at 70° C. to raise the temperature of the reaction solution, and the polymerization reaction was allowed to proceed for 60 minutes to obtain a polymerized slurry solution for the first stage.

128.8 g (1.44 mol) of an acrylic acid aqueous solution having a concentration of 80.5% by mass was put into another beaker having an internal volume of 500 mL While cooling from the outside, 159.0 g of a sodium hydroxide aqueous solution having a concentration of 27% by mass was added dropwise thereto to neutralize 75 mol % of acrylic acid. 0.129 g (0.476 mmol) of 2,2'-azobis (2-amidinopropane) dihydrochloride and 0.026 g (0.096 mmol) of potassium persulfate as the radical polymerization initiator, and 0.0116 g (0.067 mmol) of ethylene glycol diglycidyl ether as the internal crosslinking agent were added into the beaker of the neutralized acrylic acid aqueous solution and dissolved to prepare an aqueous solution for a second stage.

The polymerized slurry solution for the first stage in the separable flask was cooled to 25° C. while stirring at a rotation rate of the stirrer of 1000 rpm, and a total amount of the aqueous solution for the second stage was added thereto. After substituting the gas in the separable flask with nitrogen for 30 minutes, the separable flask was immersed again in a water bath at 70° C. to raise the temperature of the reaction solution, and a hydrogel-like polymer was obtained by the polymerization reaction for the second stage for 60 minutes.

0.589 g of diethylenetriamine pentaacetic acid pentasodium solution having a concentration of 45% by mass was added under stirring to the hydrogel-like polymer after the polymerization for the second stage. Then, the separable flask was immersed in an oil bath set at 125° C., and 216.7 g of water was extracted from the system by azeotropic distillation of n-heptane and water. Next, 4.42 g of an aqueous solution having a concentration of 2% by mass containing ethylene glycol diglycidyl ether (0.507 mmol) as a surface crosslinking agent was added to the separable flask, and a temperature thereof was held at 83° C. for 2 hours.

Then, polymer particles (dried product) were obtained by removing n-heptane by drying at 125° C. After passing the polymer particles through a sieve having an opening of 850 μm, 0.2% by mass of amorphous silica (Oriental Silicas Corporation, Tokusil NP-S) with respect to the mass of the polymer particles is was mixed with the polymer particles, thereby obtaining 229.0 g of water absorbent resin particles containing amorphous silica. The median particle size of the water absorbent resin particles was 348 μm.

Example 3

The water absorbent resin particles (amorphous crushed form) collected from an absorber of a diaper "GOO.N pants, smooth ventilation, L size for boys" (purchased in 2019) manufactured by Daio Paper Corporation were used as the water absorbent resin particles of Example 3. Since the water absorbent resin particles in the absorber were mixed with a pulp, the pulp was removed as much as possible by air injection.

3. Shaking Test

Test 1

The powder consisting of each of water absorbent resin particles was filled in a polyethylene bag with a zipper (size inside the zipper: 70 mm×50 mm, thickness of 0.04 mm, volume of 35 mL), The amount of powder to be filled was set to an amount corresponding to the theoretical filling rate of 100%, 90%, 80%, 70%, or 60%.

A polyethylene hag filled with powder was placed on a JIS standard sieve having an opening of 850 μm. Next, the powder was shaken for 30 minutes by applying vibration containing vertical motion to the standard sieve for 30 minutes by using an electromagnetic vibration type sieve shaker Octagon 200 (manufactured by endecotts) with a vibration strength set to 7. In a case of the vibration strength of 7, a calculated value of the acceleration received by the powder is 2.2 G at the maximum. The water absorption amount under load by the water absorbent resin particles after the shaking was measured. For the comparison, the water absorption amount under load by the water absorbent resin particles before the shaking was also measured.

Table 1 shows the tapped bulk density of the powder consisting of each water absorbent resin particle and the amount of powder (water absorbent resin particles) corresponding to each theoretical filling rate.

TABLE 1

| | | Tapped bulk density | Theoretical filling rate | | | | |
|---|---|---|---|---|---|---|---|
| | | [g/mL] | 100% | 90% | 80% | 70% | 60% |
| Amount of water absorbent resin particles [g] | Ex. 1 | 0.83 | 29.05 | 26.15 | 23.24 | 20.34 | 17.43 |
| | Ex. 2 | 0.87 | 30.45 | 27.41 | 24.36 | 21.32 | 18.27 |
| | Ex. 3 | 0.81 | 28.35 | 25.52 | 22.68 | 19.85 | 17.01 |

Table 2 shows measurement results of the water absorption amount under load. A numerical value in parentheses is the loss on drying. In a case of any of the water absorbent resin particles, it was confirmed that the water absorption amount under load was improved by the shaking.

TABLE 2

| | water absorption amount under load [g/g] (loss on drying [%]) | | | | | |
|---|---|---|---|---|---|---|
| | Before shaking | After shaking (shaking time: 30 minutes) | | | | |
| Theoretical filling rate | — | 100% | 90% | 80% | 70% | 60% |
| Example 1 | 17.4 | 18.2 | 19.2 | 18.8 | 18.4 | 18.2 |
| | (9.7) | (9.5) | (10.0) | (9.6) | (9.5) | (9.5) |
| Example 2 | 20.5 | 21.9 | 25.2 | 24.7 | 24.1 | 24.3 |
| | (8.9) | (9.1) | (8.7) | (8.8) | (9.0) | (9.1) |
| Example 3 | 16.8 | 17.3 | 18.9 | 18.8 | 18.5 | 18.5 |
| | (4.2) | (4.2) | (4.6) | (4.2) | (5.0) | (4.4) |

Test 2

The powders of the water absorbent resin particles of Examples 1 to 3 filled in the polyethylene bag having a theoretical filling rate of 90% were shaken in the same manner as in Test 1, except that the shaking time was changed to 300 minutes. For the water absorbent resin particles of Example 2, an intermittent shaking test of shaking for 300 minutes in total was also performed by repeating shaking and standing in the order of 2 hours of shaking, 1 hour of standing, 2 hours of shaking, 1 hour of standing, and 1 hour of shaking. The water absorption amount under load by the water absorbent resin particles after the shaking was measured. Table 3 shows evaluation results together with some of the results of Test 1. A numerical value in parentheses is the loss on drying.

TABLE 3

| | water absoiption amount under load [g/g] (loss on drying [%]) | | | |
|---|---|---|---|---|
| | Before shaking | After shaking (theoretical filling rate: 90%) | | |
| Shaking time | 0 min | 30 min. (continuous) | 300 min. (continuous) | 300 min. (intermittent) |
| Example 1 | 17.4 | 19.2 | 18.9 | — |
| | (9.7) | (10.0) | (9.7) | |
| Example 2 | 20.5 | 25.2 | 23.7 | 23.8 |
| | (8.9) | (8.7) | (8.4) | (9.2) |
| Example 3 | 16.8 | 18.9 | 20.3 | — |
| | (4.2) | (4.6) | (4.3) | |

Test 3

The powder of the water absorbent resin particles of Example 2 filled in the polyethylene bag having a theoretical filling rate of 90% were shaken in the same manner as in Test 1, except that the vibration strength of the sieve shaker was changed to 1, 3, or 10. The water absorption amount under load by the water absorbent resin particles after the shaking was measured. Table 4 shows evaluation results together with some of the results of Test 1. A numerical value in parentheses is the loss on drying. Table 4 also shows a calculated value (maximum value) of the acceleration received by the powder in a case of each vibration strength,

TABLE 4

| | water absorption amount under load [g/g] (loss on drying [%]) | | | | |
|---|---|---|---|---|---|
| | Before shaking | After shaking (shaking time: 30 minutes) | | | |
| Vibration strength | — | 1 | 3 | 7 | 10 |
| Acceleration | — | 0.10G | 0.50G | 2.20G | 3.00G |
| Example 2 | 20.5 | 22.6 | 24.4 | 25.2 | 23.3 |
| | (8.9) | 8.5 | (9.0) | (8.7) | (9.1) |

REFERENCE SIGNS LIST

1: Powder containing water absorbent resin particles
3: Container
5: Support

The invention claimed is:

1. A method for improving water absorbent resin particles, the method comprising:

filling a container with a powder containing a plurality of water absorbent resin particles, an amount of the powder contained in the container corresponding to a theoretical filling rate of 90% or less, wherein the theoretical filling rate is a value calculated by the following equation:

Theoretical filling rate $[\%] = \{(X[g]/D[g/mL])/V[mL]\} \times 100$, where X represents a mass of the powder, D represents a tapped bulk density of the powder, and V represents a maximum capacity of the container; and shaking the container filled with the powder so as to improve a water absorption under load of the water absorbent resin particles from a first water absorption amount under load to a second water absorption amount under load, a maximum value of an acceleration received by the powder during shaking being 0.050 to 4.0 G, the water absorbent resin particles prior to the shaking having the first water absorption amount under load, and the water absorbent resin particles after the shaking having the second water absorption amount under load that is at least 103% of the first water absorption amount.

2. The method according to claim 1, wherein a time for shaking the powder contained in the container is 10 minutes or longer in total.

3. The method according to claim 1, wherein the maximum value of the acceleration received by the powder during shaking is 0.050 to 2.5 G.

4. The method according to claim 1, wherein the amount of the powder contained in the container corresponds to a theoretical filling rate of 65% or more.

5. A method for producing water absorbent resin particles, the method comprising:

obtaining water absorbent resin particles comprising a polymer having an ethylenically unsaturated monomer as a monomer unit by polymerizing a monomer comprising the ethylenically unsaturated monomer, and improving a water absorption amount under load of the water absorbent resin particles by treating the water absorbent resin particles with the method according to claim 1.

* * * * *